United States Patent
Shibata

(10) Patent No.: US 7,717,605 B2
(45) Date of Patent: May 18, 2010

(54) LIQUID CRYSTAL DISPLAY DEVICE

(75) Inventor: Michihide Shibata, Mutsuzawa (JP)

(73) Assignees: Hitachi Displays, Ltd., Mobara-shi (JP); Hitachi Display Devices, Ltd., Mobara-shi (JP)

( * ) Notice: Subject to any disclaimer, the term of this patent is extended or adjusted under 35 U.S.C. 154(b) by 0 days.

(21) Appl. No.: 11/834,035

(22) Filed: Aug. 6, 2007

(65) Prior Publication Data

US 2008/0030651 A1 Feb. 7, 2008

(51) Int. Cl.
*F21V 7/04* (2006.01)
(52) U.S. Cl. .................. 362/630; 362/612; 362/97.3
(58) Field of Classification Search .............. 362/630, 362/631, 600, 608, 612, 555, 511, 330, 561, 362/97.1, 97.2, 97.3
See application file for complete search history.

(56) References Cited

U.S. PATENT DOCUMENTS

| | | | | |
|---|---|---|---|---|
| 5,727,862 A * | 3/1998 | Wu | ............................ | 362/27 |
| 5,876,107 A * | 3/1999 | Parker et al. | ................. | 362/600 |
| 5,946,062 A * | 8/1999 | Hasegawa et al. | ............. | 349/58 |
| 6,134,092 A * | 10/2000 | Pelka et al. | ................... | 361/31 |
| 2001/0048492 A1* | 12/2001 | Natsuyama | ................... | 349/58 |
| 2002/0018053 A1* | 2/2002 | Kyomoto | ..................... | 345/204 |
| 2002/0175632 A1* | 11/2002 | Takeguchi | ................ | 315/169.1 |
| 2003/0227769 A1* | 12/2003 | Osawa | ......................... | 362/31 |
| 2004/0051484 A1* | 3/2004 | Moon | .......................... | 315/312 |
| 2006/0038504 A1* | 2/2006 | Lee et al. | .................... | 315/224 |

FOREIGN PATENT DOCUMENTS

JP 2002-169034 6/2002

* cited by examiner

*Primary Examiner*—Sandra L O'Shea
*Assistant Examiner*—Danielle Allen
(74) *Attorney, Agent, or Firm*—Antonelli, Terry, Stout & Kraus, LLP.

(57) ABSTRACT

A liquid-crystal display device is provided which has a backlight that applies light onto a liquid crystal panel. The backlight includes a light guide having an LED as a light-emitting device. The light guide has recesses on the light incident surface, in which electric elements are disposed. Disposing the electric elements connected to external driving circuit in the backlight can reduce the area for mounting the electric elements.

8 Claims, 14 Drawing Sheets

LIQUID CRYSTAL DISPLAY DEVICE

BACKGROUND OF THE INVENTION

1. Field of the Invention

The present invention relates to the light source of non-luminescence display devices, and more particularly, to a liquid-crystal display device having a backlight provided with a light guide and that uses an LED as a light source.

2. Description of the Related Art

Liquid-crystal display devices have been frequently used as display devices in recent years. Particularly, liquid-crystal display devices have been used for the displays of portable devices because of their thin, lightweight, and energy saving features.

However, liquid-crystal display devices need lighting means because they are not of light-emitting type. Popular lighting units used in liquid-crystal display devices include planar lighting units called backlights. Cold-cathode fluorescence lamps have been generally used as the light-emitting devices (also referred to as light sources) of the backlights, while light-emitting diodes (LEDs) are also used as the light-emitting devices.

The backlights have a planar light guide. The light guide is made of light-transmissive resin or the like, so that light which is emitted from light-emitting devices and enters the light guide. The light guide transmits through the light. The light guide has reflecting or dispersing members such as grooves, protrusions, or prints. The reflecting or dispersing members cause the light that transmits through the light guide to advance toward the liquid-crystal display device.

The use of LEDs as light-emitting devices poses the problem of difficulty in letting out uniform light from the light guide because they are point light sources. To cope with such a problem, for example, JP-A-2002-169034 proposes a technique of dispersing the light around the LEDs evenly in which the light incident surface of the light guide has notches.

SUMMARY OF THE INVENTION

Backlights that use a plurality of LEDs as light-emitting devices so as to emit high-luminance light are constructed such that the LEDs are disposed in a discrete manner on a circuit board. Portable devices equipped with a liquid-crystal display device have a limitation to the area for mounting the electric elements of the circuit.

According to a aspect of the invention, a liquid-crystal display device includes: a display panel; and a backlight that applies light onto the display panel, wherein the backlight has: a light-emitting device; a light guide into which the light from the light-emitting device comes; electric elements; and a circuit board on which the light-emitting device and the electric elements are mounted. The light guide has recesses on the light incident surface, in which the electric elements are disposed.

Disposing the electric elements between the LEDs can reduce the area of the circuit board, thus achieving more compact portable devices. More specifically, arranging lines from a portable device to the LED-equipped circuit board and disposing electric elements necessary for the portable device on the circuit board of the backlight can reduce the area for mounting the electric elements of the portable device.

According to another aspect of the invention a liquid-crystal display device includes: a liquid crystal panel; and a planar lighting unit that applies light onto the liquid crystal panel. The planar lighting unit includes: a light guide having a light exiting surface and a bottom surface opposite to the light exiting surface. The light guide also has side faces perpendicular to the light exiting surface or the bottom surface, along a first side of which a plurality of LEDs is disposed. The light from the LEDs is let in the first side, or the light incident surface of the light guide. The LEDs are mounted on the circuit board. The first side has recesses. The electric devices are mounted on the circuit board so that the electric elements are disposed in the recesses.

The electric elements to be used for a circuit for driving the liquid crystal panel or the circuit of a portable device equipped with the liquid crystal panel are mounted on the LED-equipped circuit board so that the area for mounting the electric elements is reduced.

DESCRIPTION OF THE PREFERRED EMBODIMENTS

Figure 1:
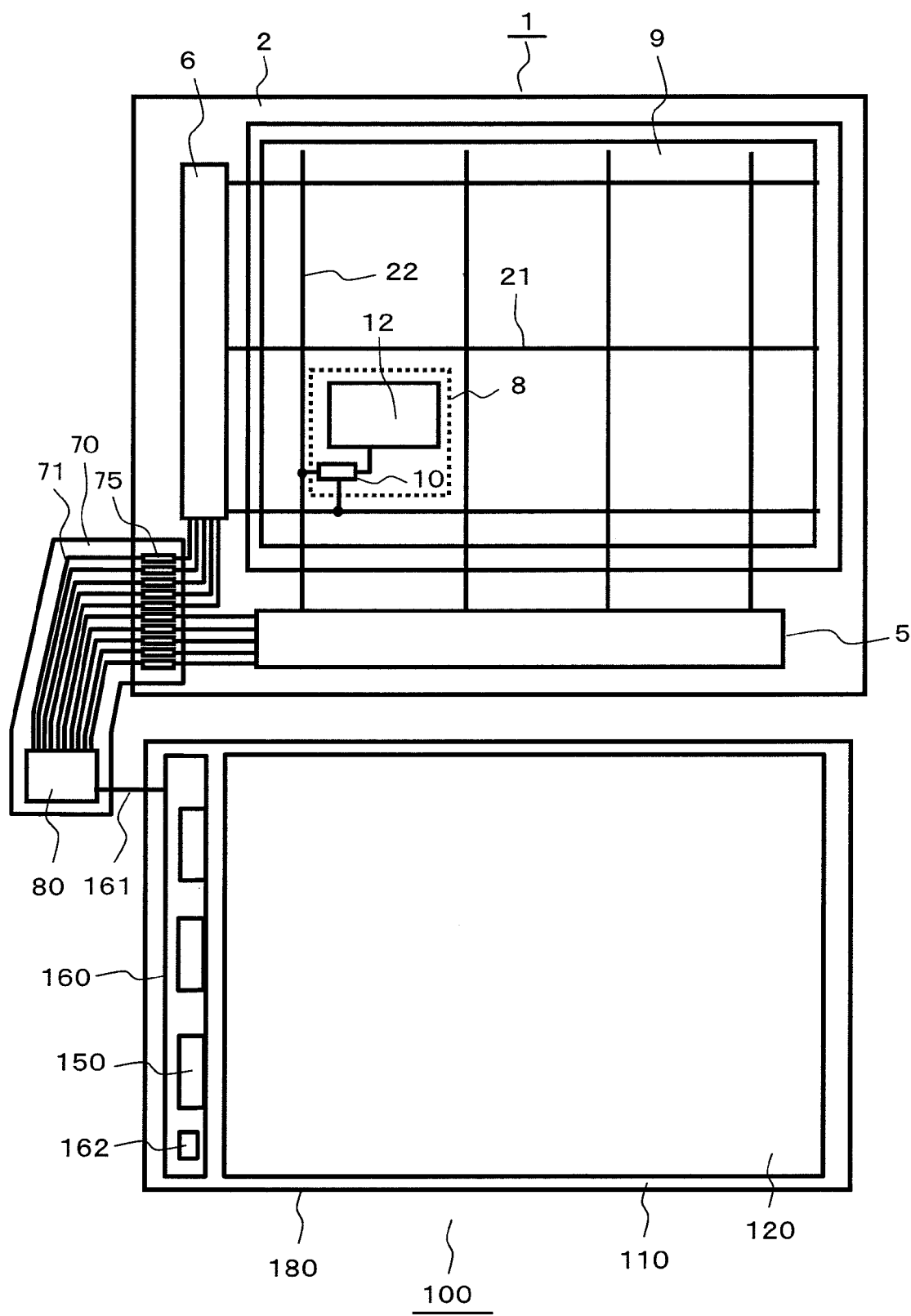
FIG. 1 is a block diagram showing schematic constitution of a liquid-crystal display device according to an embodiment of the invention.

FIG. 1 is a plan view of a liquid-crystal display device 100 according to an embodiment of the invention. The liquid-crystal display device 100 includes a liquid crystal panel 1, a backlight 110, and a control circuit 80. The control circuit 80 supplies signals and supply voltage necessary for display on the liquid crystal panel 1. The control circuit 80 is mounted on a flexible board 70, from which signals are sent to the liquid crystal panel 1 through lines 71 and terminals 75.

The backlight 110 includes a light guide 120, LEDs 150, and a casing 180. The backlight 110 is disposed to illuminate the liquid crystal panel 1 with light. The liquid crystal panel 1 controls the amount of transmission or reflection of the light from the backlight 110 for display. While the backlight 110 is placed on the back or front surface of the liquid crystal panel 1, as viewed from the viewer, FIG. 1 shows the backlight 110 beside of the liquid crystal panel 1 for the convenience of description.

The light guide 120 is substantially rectangular in shape and has the LEDs 150 on one side. Reference numeral 160 denotes a flexible board that electrically connects the LEDs 150. The flexible board 160 and the control circuit 80 are electrically connected by a line 161. The flexible board 160 has electric elements 162 mounted thereon. The details of the electric elements 162 will be described later.

The liquid crystal panel 1 will now be described. The liquid crystal panel 1 has a TFT substrate 2. A pixel section 8 of the TFT substrate 2 has a pixel electrode 12. While the liquid crystal panel 1 has a large number of the pixel sections 8 in matrix form, only one pixel section 8 is shown in FIG. 1 for the sake of simplicity. The matrix pixel sections 8 constitute a display region 9. The pixel sections 8 serve as the pixels of a display image to provide an image on the display region 9.

The TFT substrate 2 has gate signal lines (also referred to as scanning lines) 21 which extend in the X direction and arranged in parallel in the Y direction and drain signal lines (also referred to as video signal lines) 22 which extend in the Y direction and arranged in parallel in the X direction. The gate signal lines 21 and the drain signal lines 22 intersect each other. The pixel sections 8 are each formed in the region surrounded by the gate signal lines 21 and the drain signal lines 22.

Each pixel section 8 has a switching element 10. A control signal is supplied through the gate signal line 21 to control the on-off action of the switching element 10. When the switching element 10 is turned on, a video signal sent through the drain signal line 22 is fed to the pixel electrode 12.

The drain signal lines 22 are connected to a driving circuit 5. The driving circuit 5 outputs video signals. The gate signal lines 21 are connected to a driving circuit 6. The driving circuit 6 outputs control signals. The gate signal lines 21, the drain signal lines 22, the driving circuit 5, and the driving circuit 6 are formed on the same TFT substrate 2.

Figure 2A:
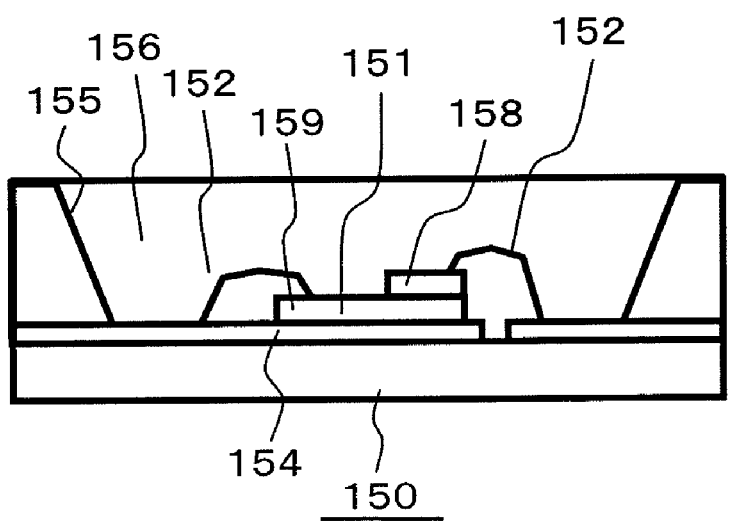
FIG. 2A is a schematic cross sectional view of a light emitting diode of a liquid-crystal display device according to an embodiment of the invention.
Figure 2B:
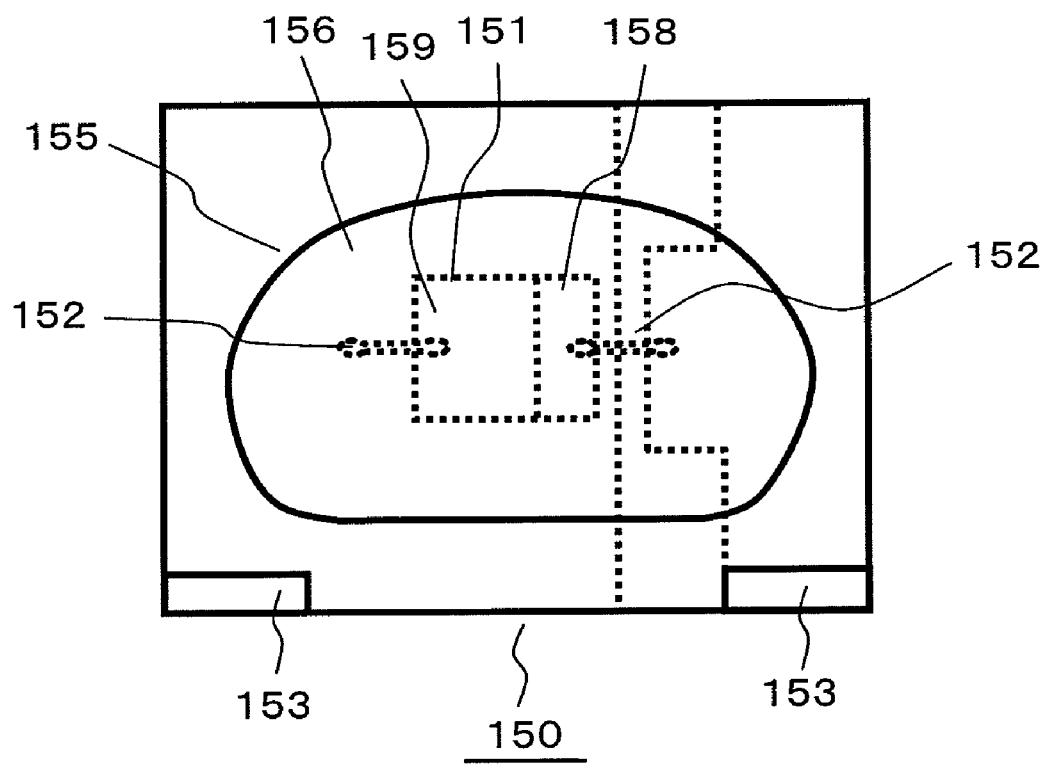
FIG. 2B is a light-exiting-side front view of the light emitting diode of the liquid-crystal display device of the embodiment.

FIGS. 2A and 2B show the schematic structure of the LED 150 that is a light-emitting device, wherein FIG. 2A is a schematic cross sectional view of the LED 150, and FIG. 2B is a light-exiting-side front view of the same.

The LED 150 has a structure in which an LED chip 151 serving as a light emitter is mounted on a chip board 154. The LED chip 151 has a PN junction. When voltage is applied to the PN junction, the PN junction emits light of a specific wavelength. A P-type semiconductor layer of the PN junction has a P electrode (anode) 158, while an N-type semiconductor layer has an N electrode (cathode) 159.

The P electrode 158 and the N electrode 159 each connect to a wire 152. The wires 152 electrically connect the P electrode 158 and the N electrode 159 to chip terminals 153 for connecting the LED 150 externally, respectively.

The LED chip 151 may have a fluorescent emission section 156 on the light exiting surface. The fluorescent emission section 156 has the function of converting the wavelength of the light emitted from the LED chip 151. A reflecting section, denoted at numeral 155, reflects the light forward.

Figure 3A:
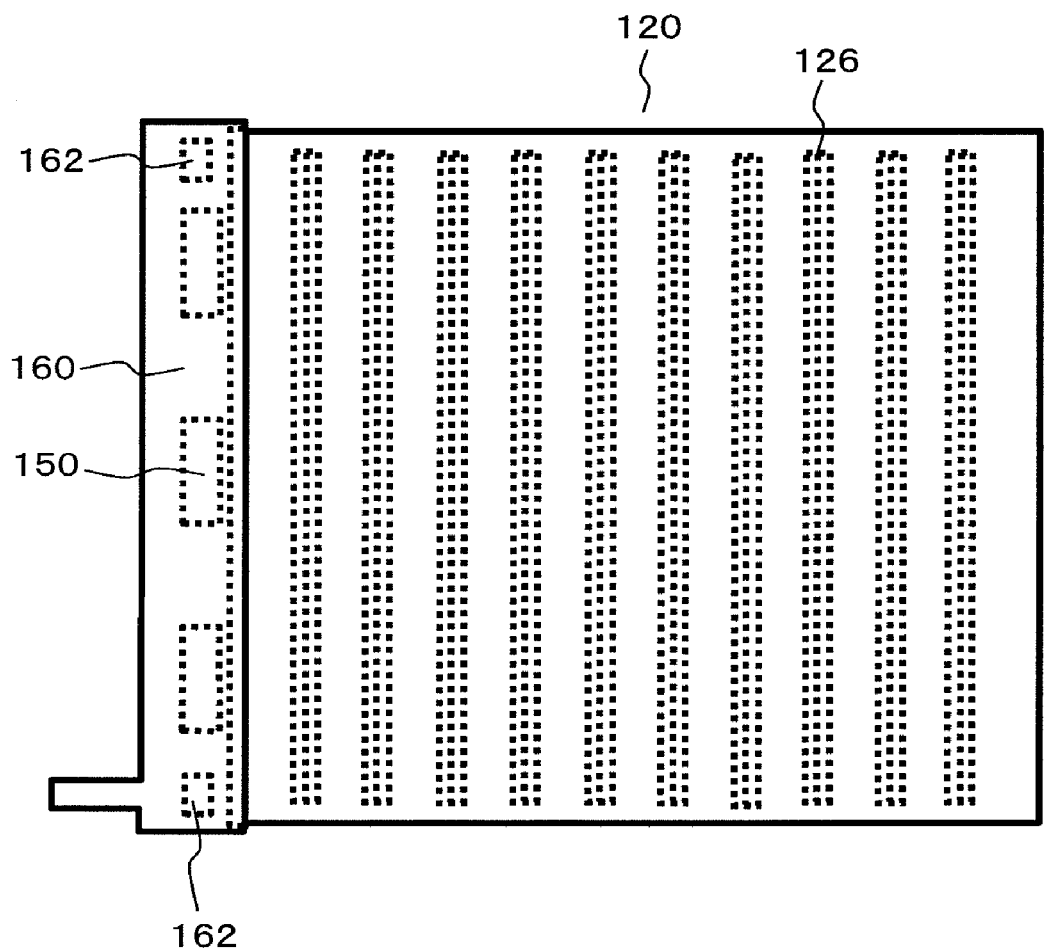
FIG. 3A is a schematic plan view of a light guide of a liquid-crystal display device according to an embodiment of the invention.
Figure 3B:
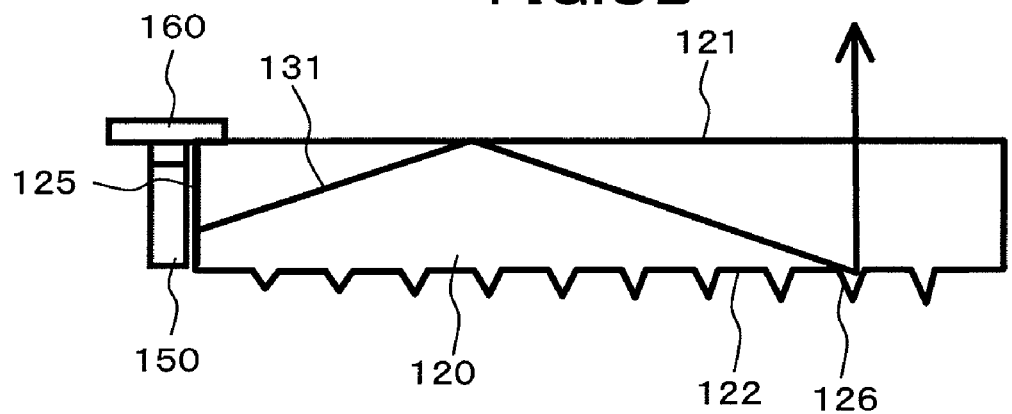
FIG. 3B is a schematic side view of the light guide of the liquid-crystal display device of the embodiment.

FIG. 3A shows a schematic plan view of the light guide 120, and FIG. 3B shows a schematic side view of the same. The light guide 120 is rectangular in shape as shown in FIG. 3A, and has a top face 121 and a bottom face 122, as shown in FIG. 3B. The light guide 120 is made of a light transmissive material such as acrylic resin or polycarbonate resin, and has the shape of a plate with a thickness from 1.0 mm to 0.2 mm. Although the light guide 120 in FIG. 3B has a rectangular cross section, it may have a wedge shape whose thickness decreases from a light incident surface 125.

FIGS. 3A and 3B show the positional relationship between the light guide 120 and the LEDs 150. The plurality of LEDs 150 is disposed in the vicinity of the light incident surface 125 at least on one side of the light guide 120. The LEDs 150 are disposed under the flexible board 160 and along the light incident surface 125.

The light 131 that has exited from the LEDs 150 enters the light incident surface 125. Since the refractivity of the light guide 120 is higher than that of air, light incident on the light incident surface 125 at angles larger than a specified angle with respect to the normal to the light incident surface is reflected, while light incident at angles lower than that enters the light guide 120.

The top face 121 and the bottom face 122 of the light guide 120 are substantially perpendicular to the light incident surface 125. The bottom face 122 has V-shaped reflecting portions 126. The light that has come into the light guide 120 repeats total reflection between the top face 121 and the bottom face 122 to advance in the light guide 120. The light that advances in the light guide 120 is reflected by the reflecting portions 126 provided on the bottom face 122 to the top face 121 and exits from the top face 121.

Figure 4A:
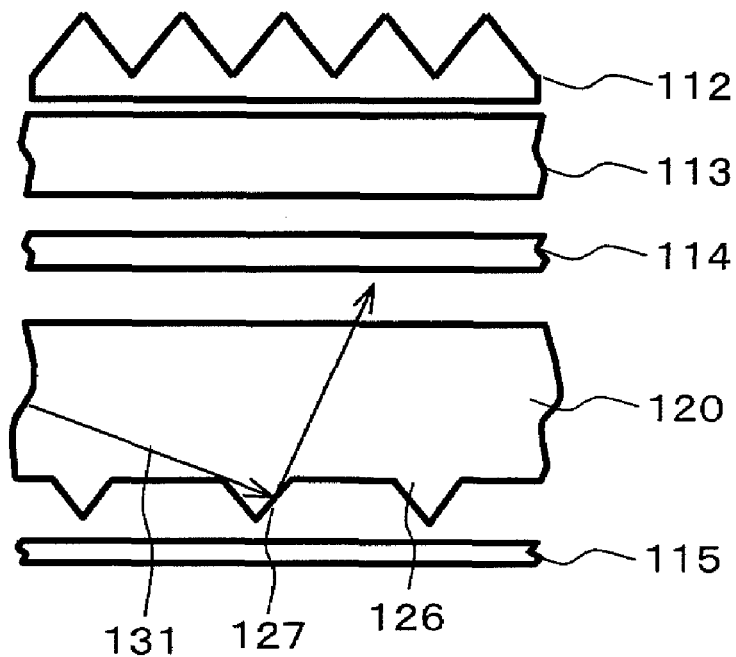
FIG. 4A is a schematic cross sectional view of a conventional light guide.
Figure 4B:
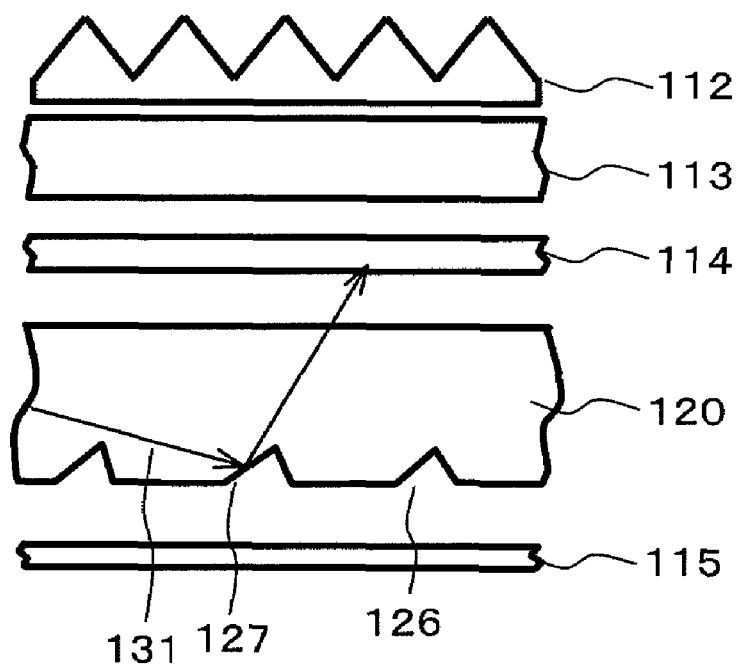
FIG. 4B is a schematic cross sectional view of a light guide of a liquid-crystal display device according to an embodiment of the invention.

Referring to FIGS. 4A and 4B, the light reflected by the reflecting portions 126 will be described. FIG. 4A shows a case in which the reflecting portions 126 are outward protrusions, while FIG. 4B shows a case in which the reflecting portions 126 are inward recesses. The reflecting portions 126 each have a reflecting surface (also referred to as a slope) 127. The reflecting surface 127 forms an angle from 2 to 35 degrees with the bottom face 122. The light reflected by the reflecting surface 127 exits such that it expands externally at a large angle with respect to the line perpendicular to the top face 121 of the light guide 120 (at an obtuse angle with respect to the top face 121). Therefore, prism sheets 113 and 112 are disposed above the light guide 120 to reflect the outward light toward the liquid crystal panel (not shown). Numeral 114 denotes a diffuser, and numeral 115 designates a reflecting sheet.

Figure 5:
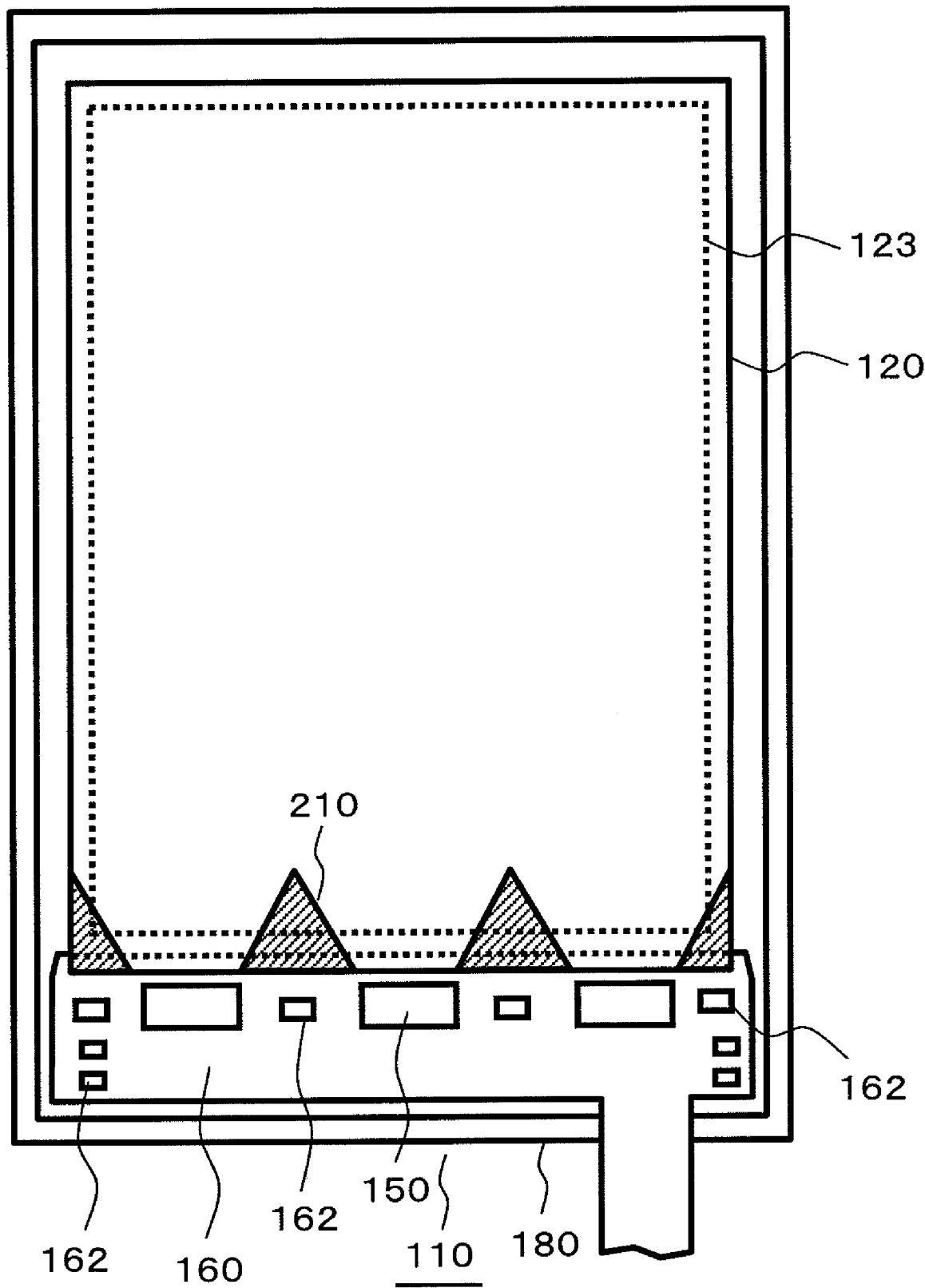
FIG. 5 is a schematic diagram of a backlight of a liquid-crystal display device according to an embodiment of the invention, showing a problem when a plurality of light-emitting devices is used.

Referring to FIG. 5, the light in the neighborhood of the LEDs 150 will be described. The LEDs 150 are disposed to face the light incident surface 125 of the light guide 120. Most of the light exiting from the LEDs 150 travels in the direction substantially perpendicular to the light incidence surface 125 (the Y direction in FIG. 5), so that most of the light exiting from the LEDs 150 enters the light guide 120 from the neighborhood of the LEDs 150.

Since light of angles above a predetermined angle with respect to the normal to the light incident surface 125 is reflected by the light incident surface 125, as described above, extremely little light reaches the regions of the light incident surface 125 beyond the predetermined angle to form dark regions 210.

The flexible board 160 has the LEDs 150 and the electric elements 162 including resistors and capacitors. Part of the electric elements 162 is used for lighting the LEDs 150, while most of them are electrically connected to the driving circuit 5, the driving circuit 6, and the control circuit 80 via the lines formed on the flexible board 160 as shown in FIG. 1 to drive the circuits.

The discrete arrangement of the LEDs 150, as shown in FIG. 5, has the problem of causing the dark regions 210 to decrease the display quality, but allows the electric elements 162 to be disposed between adjacent two LEDs 150, reducing the area for the electric elements 162.

Numeral 123 in the drawing indicates a light shielding frame. The inner boundary of the light shielding frame 123 is indicated by a dotted line for the convenience of illustration. The light shielding frame 123 is a low-transmittance frame printed or the like outside the dotted line on the light diffuser 114 or the like.

Not all but part of the dark region 210 is covered with the light shielding frame 123 because the distance from the LEDs 150 to the boundary of the light shielding frame 123 is short.

Figure 6:
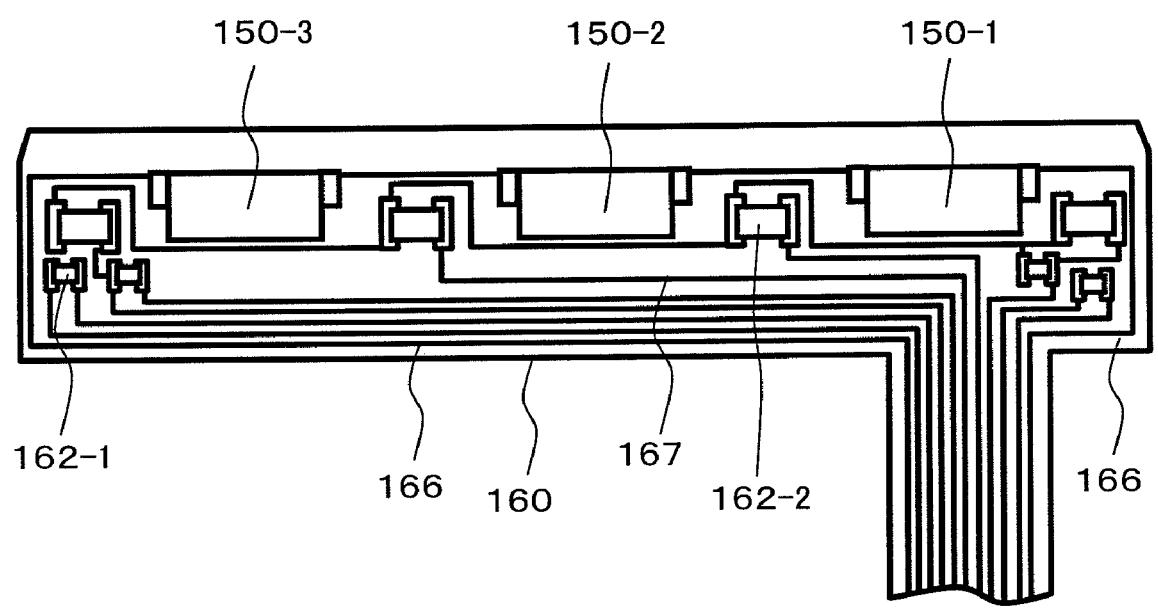
FIG. 6 is a schematic diagram of a flexible board of a liquid-crystal display device according to an embodiment of the invention.

Referring to FIG. 6, the lines on the flexible board 160 will be described. The main object of the flexible board 160 is to supply power to the LEDs 150. To that end, the flexible board 160 has power lines 166 connected to the LEDs 150.

The potential difference among the LEDs 150 ranges from 2 V to 4 V. Thus, about three to five LEDs 150 are connected in series so as to decrease the number of lines, to which a power voltage of 9 V to 16 V is applied.

The flexible board 160 has, in addition to the LEDs 150, electric elements 162 including chip resistors 162-1 and chip capacitors 162-2. The electric elements 162 are not only used to control the power voltage to the LEDs 150, but also connected to the driving circuit 5, the driving circuit 6, and the control circuit 80 other than the backlight 110 and are used as part of those circuits. Lines 167 are provided on the flexible board 160 to electrically connect the electric elements 162 to the driving circuit 5, the driving circuit 6, and the control circuit 80 other than the backlight 110.

When, in addition to both the driving circuits 5 and 6, also the electric elements 162 are mounted on the liquid crystal panel 1, the process of manufacture becomes complicated. Thus, mounting the electric elements 162 on the flexible board 160 simplifies the process of manufacture.

The control circuit 80 is mounted on the flexible board 70. The flexible board 70 is required to have a smallest possible area. Therefore, mounting the control circuit 80 on the flexible board 70 and mounting part of the electric elements 162 connected to the control circuit 80 on the flexible board 160 can decrease the area of the flexible board 70.

Here, the electric elements 162 are mounted on the empty space of the flexible board 160. The flexible board 160 is also required to decrease in area. Therefore, it becomes difficult to provide space for the electric elements 162 on the flexible board 160 as the electric elements 162 increases in number.

Figure 7:
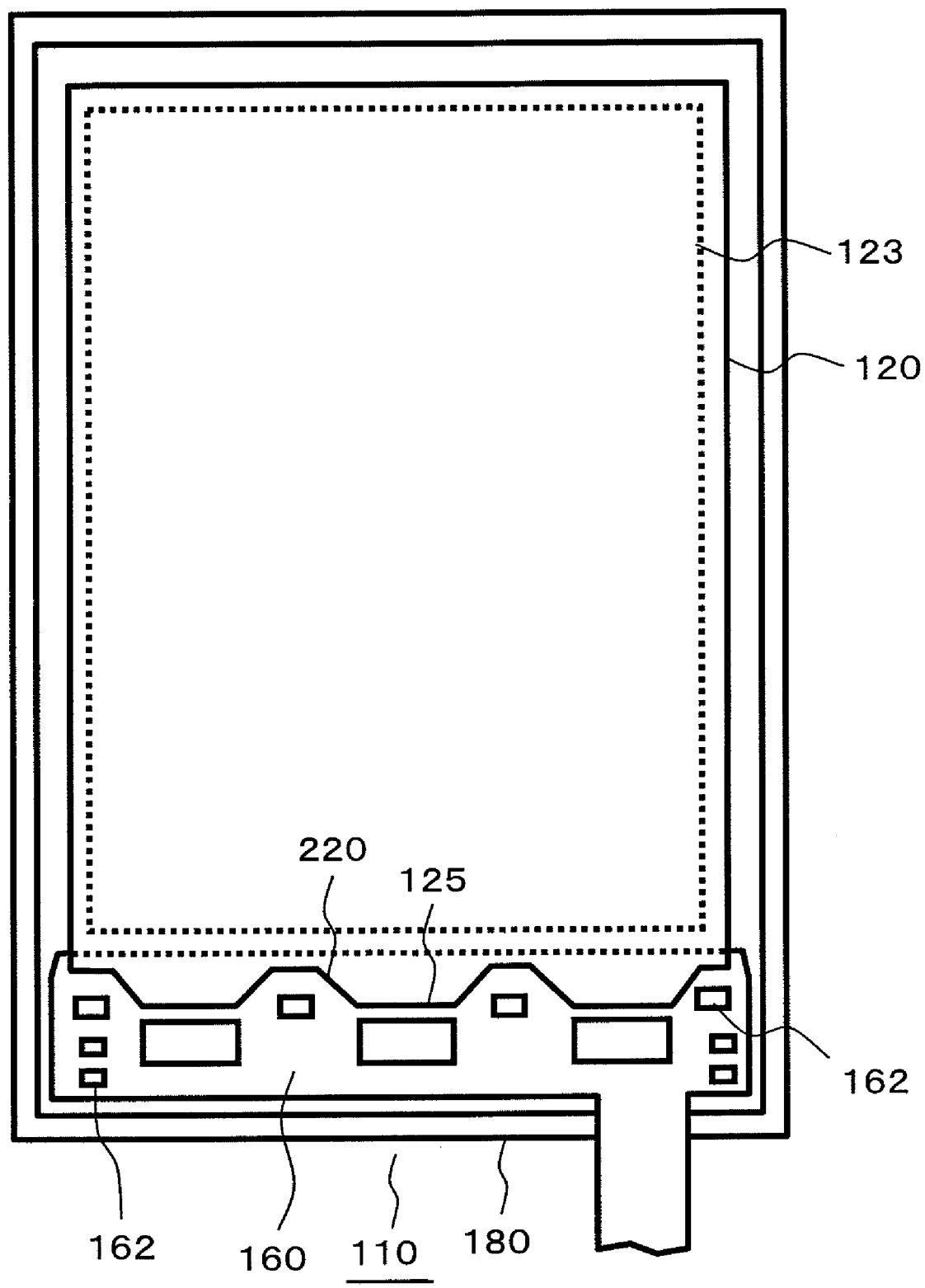
FIG. 7 is a schematic plan view of a backlight of a liquid-crystal display device according to an embodiment of the invention.

FIG. 7 illustrates recesses 220 of the light guide 120 which cut out the dark regions 210. The recesses 220 allow the electric elements 162 mounted on the flexible board 160 to be disposed therein.

The presence of the recesses 220 avoids the interference of the electric elements 162 on the flexible board 160 with the light guide 120, allowing the electric elements 162 to be disposed closer to the light guide 120 than to the LEDs 150.

The region of the flexible board 160 overlapping with the light guide 120 can have lines. Connecting the lines to the electric elements 162 on the side closer to the light guide 120 than to the LEDs 150 allows making good use of the region where the light guide 120 and the flexible board 160 overlap.

This makes the LEDs 150 separate from the boundary of the light shielding frame 123, thereby increasing the area of the dark regions 210 covered with the light shielding frame 123. That is, forming the lines closer to the boundary of the light shielding frame 123 than to the LEDs 150 can increase the distance between the LEDs 150 and the boundary of the light shielding frame 123.

The inside of the light shielding frame 123 forms the surface of the liquid crystal panel 1 illuminated by the light exiting from the light guide 120. The increase in the distance from the LEDs 150 to the illuminated surface ensures a space for light to spread evenly with no dark region appearing on the illuminated surface. This can decrease unevenness of luminance generated in the vicinity of the light incidence surface 125.

Figure 8A:
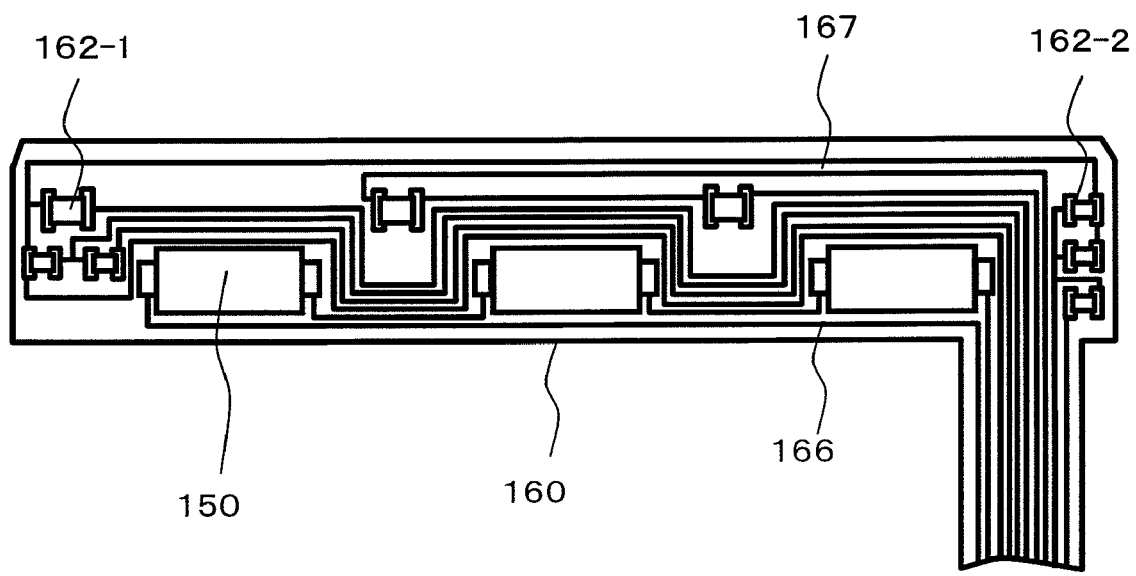
FIG. 8A is a schematic diagram of a flexible board of a liquid-crystal display device according to an embodiment of the invention.

FIG. 8A shows the flexible board 160 on which the lines are formed on the side closer to the light guide 120 than to the LEDs 150. In FIG. 8A, the light guide 120 is disposed above in the drawing.

The presence of the recesses 220 in the light guide 120 allows the LEDs 150 to be disposed below in the drawing, and the lines 167 connecting to the electric elements 162 to be disposed on the side closer to the light guide 120 than the lines 166 connecting to the LEDs 150.

Figure 8B:
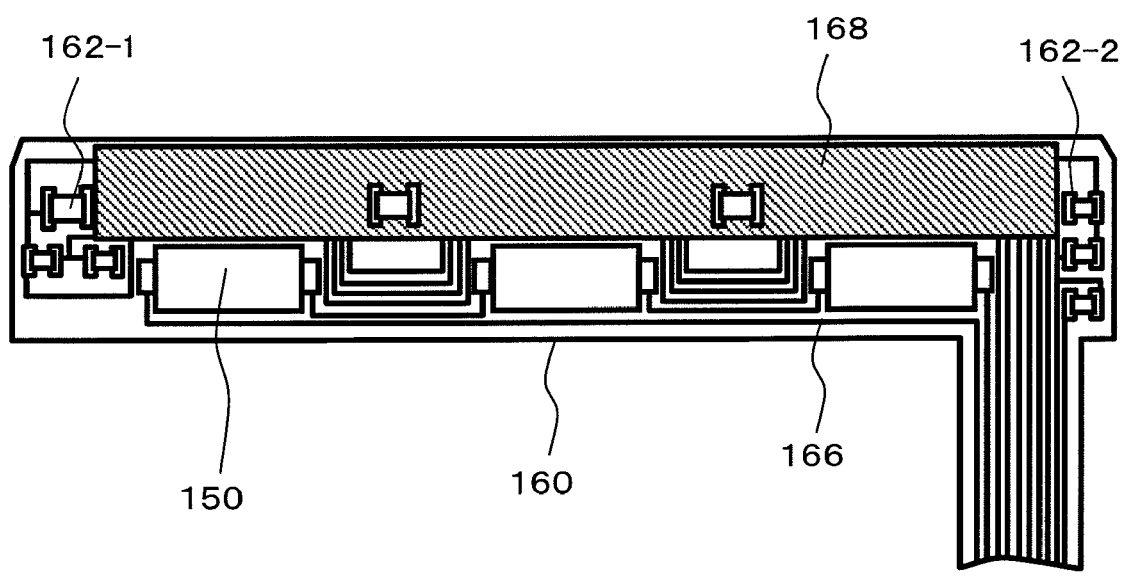
FIG. 8B is a schematic diagram of a flexible board of a liquid-crystal display device according to an embodiment of the invention.

FIG. 8B shows the flexible board 160 on which a reflecting member 168 is disposed on the side to which the light from the LEDs 150 exits. The light from the LEDs 150 which reaches the flexible board 160 is reflected by the reflecting member 168 toward the light guide 120. The reflecting member 168 can be manufactured either by printing a white coating or by bonding a reflecting sheet.

Figure 9:
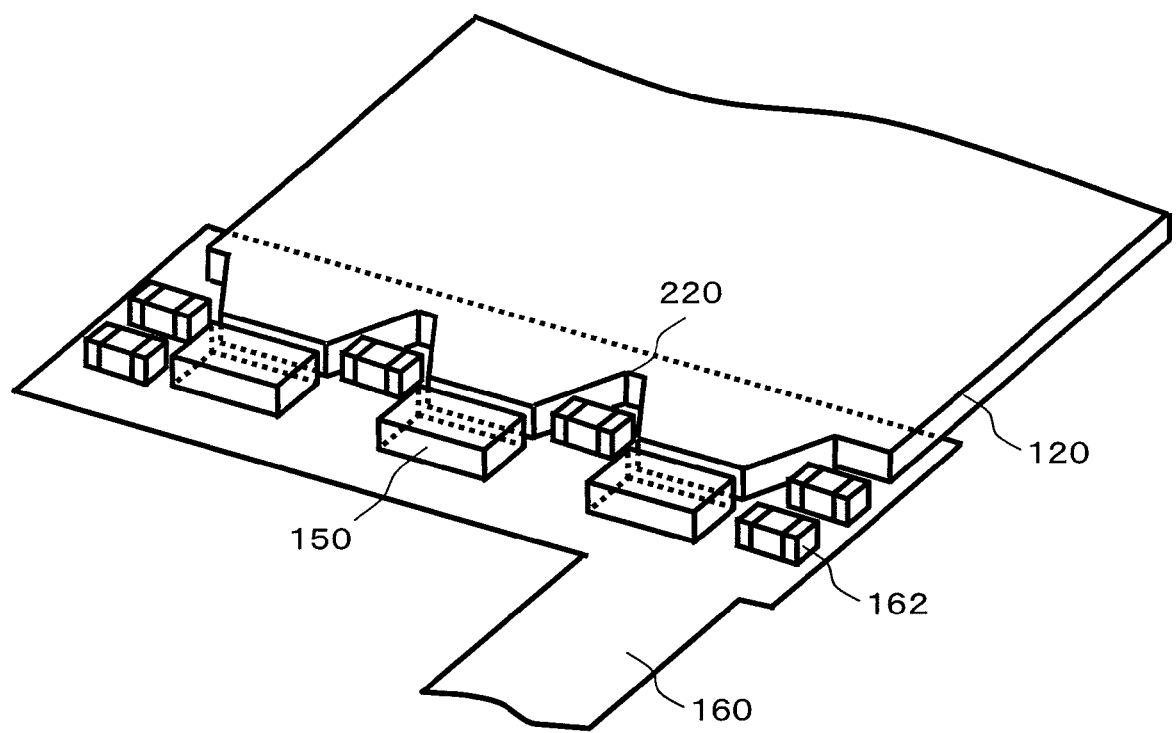
FIG. 9 is a schematic perspective view of a backlight of a liquid-crystal display device according to an embodiment of the invention.

FIG. 9 is a perspective view of the light guide 120. The light guide 120 is provided with the recesses 220, in which the electric elements 162 mounted on the flexible board 160 are fit.

Figure 10:
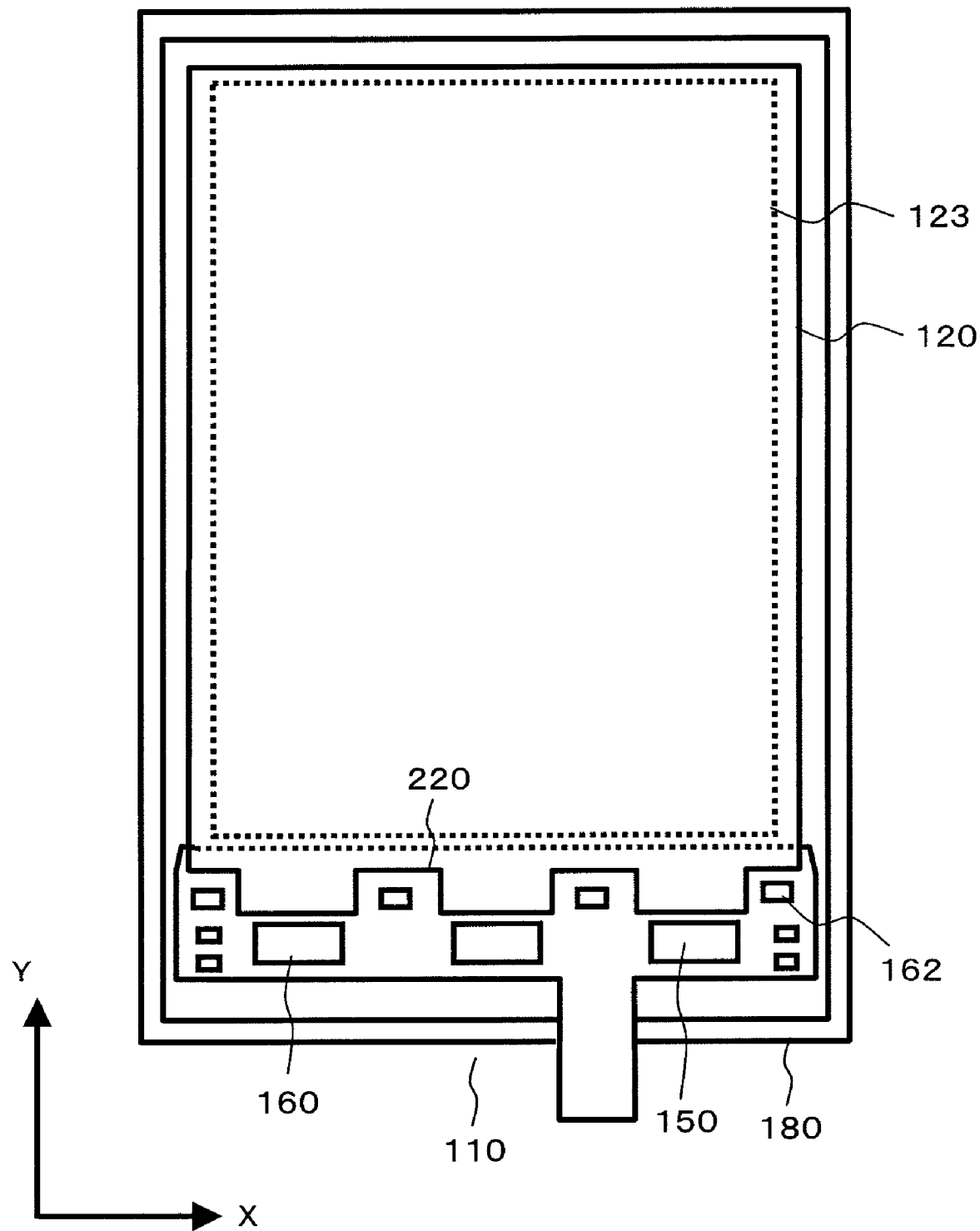
FIG. 10 is a schematic plane view of a backlight of a liquid-crystal display device according to an embodiment of the invention.
Figure 11:
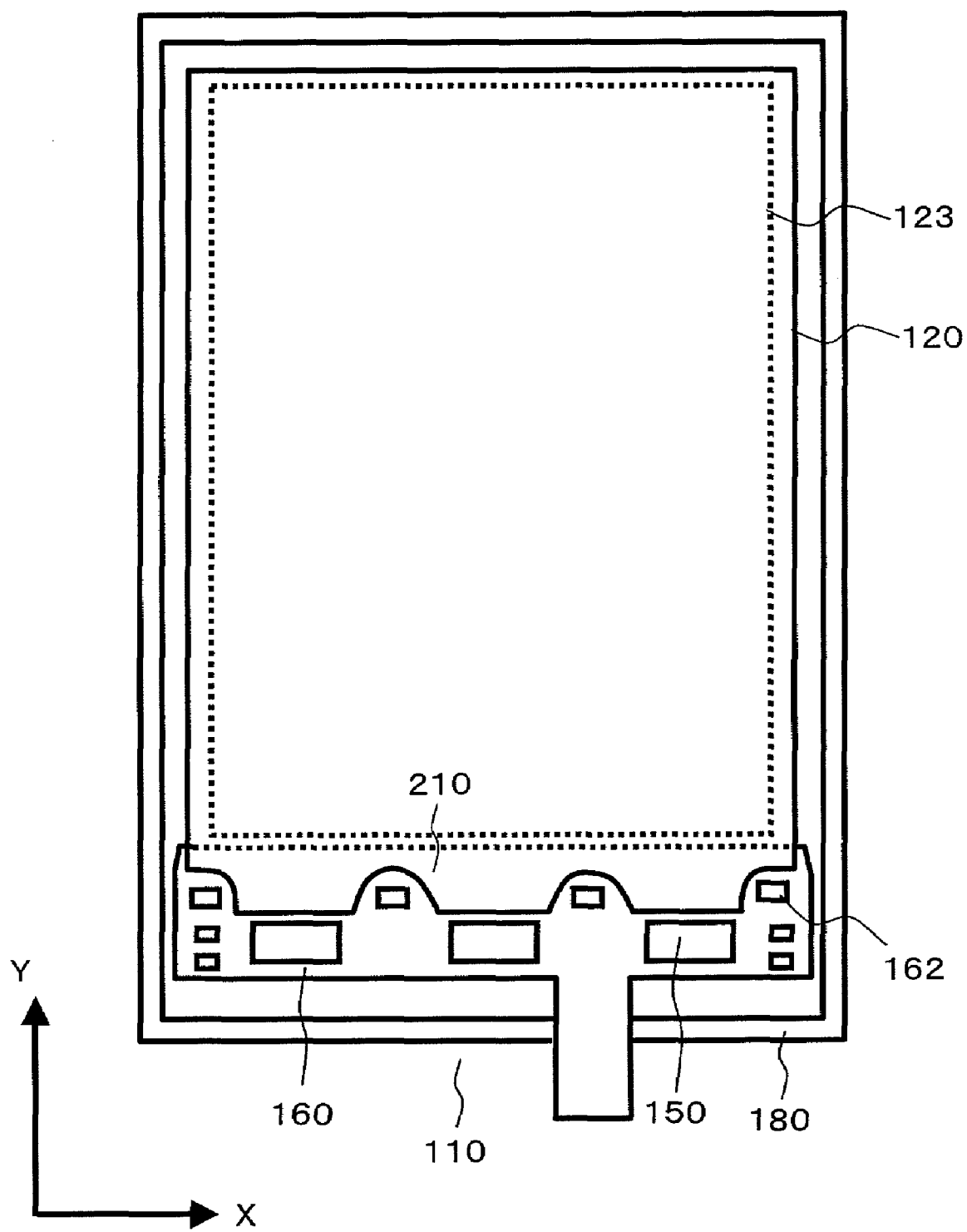
FIG. 11 is a schematic plane view of a backlight of a liquid-crystal display device according to an embodiment of the invention.
Figure 12:
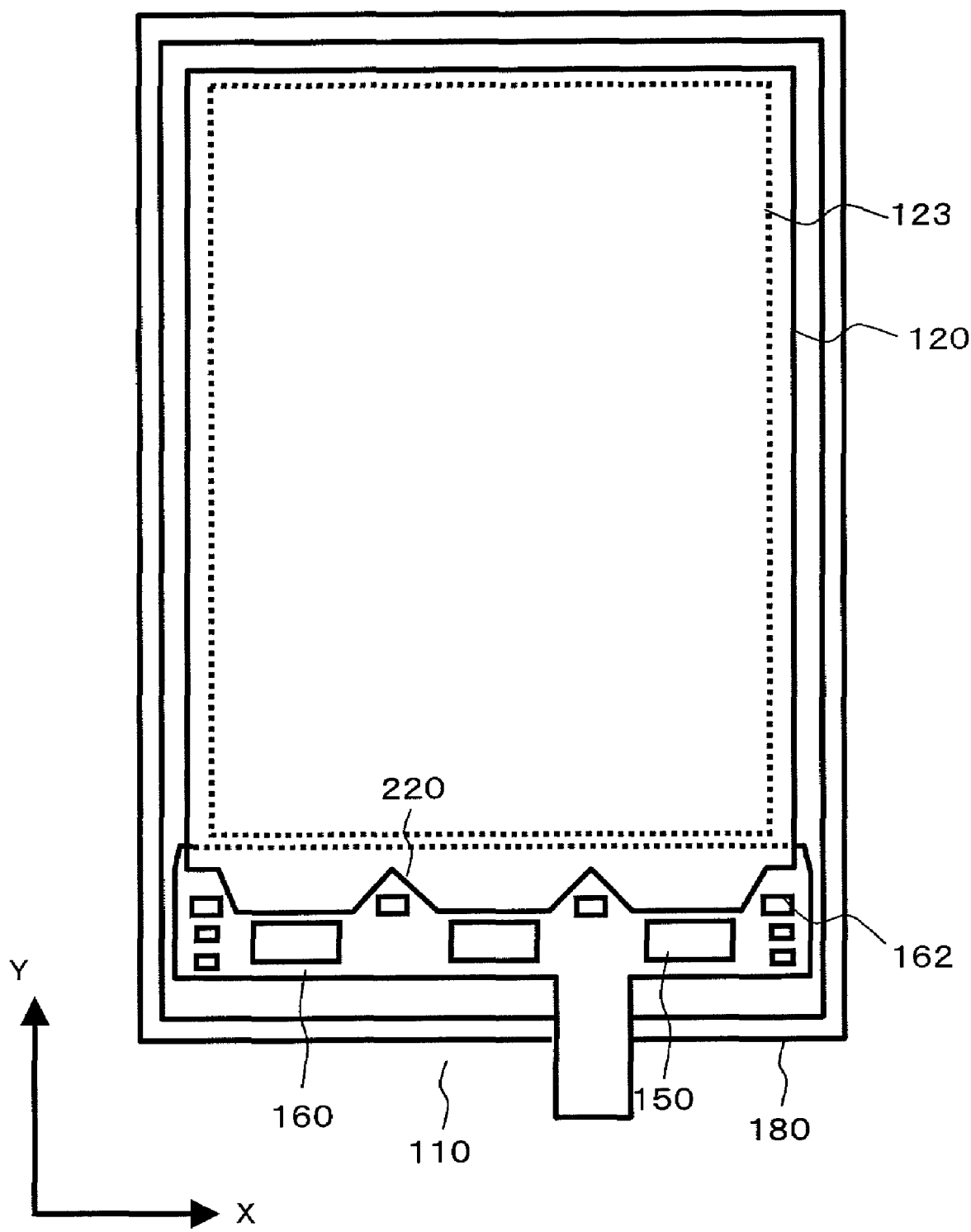
FIG. 12 is a schematic plane view of a backlight of a liquid-crystal display device according to an embodiment of the invention.

FIG. 10 shows rectangular recesses 220; FIG. 11 shows semicircular recesses 220; and FIG. 12 shows triangular recesses 220. The flexible boards 160 each have the lines 167 and the reflecting member 168 as in FIG. 8.

Figure 13:
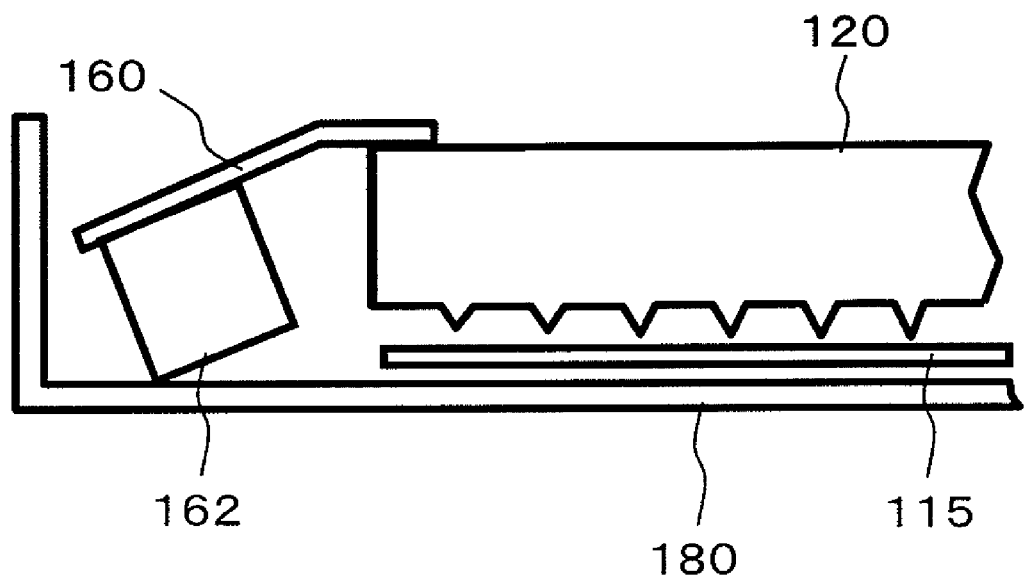
FIG. 13 is a schematic diagram of a backlight of a liquid-crystal display device according to an embodiment of the invention, showing a problem of the same.

FIG. 13 shows a problem when the electric elements 162 are disposed on the flexible board 160. The flexible board 160 is housed in the casing 180. When the casing 180 is made of metal and the flexible board 160 is deformed, the electric elements 162 come into contact with the metallic casing 180 to short-circuit.

Figure 14:
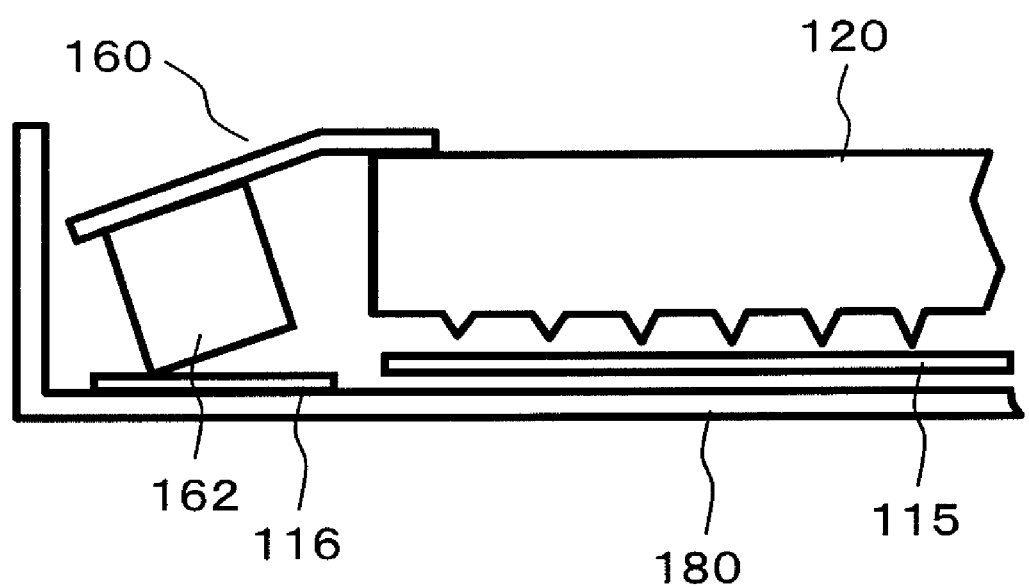
FIG. 14 is a schematic diagram of a backlight of a liquid-crystal display device according to an embodiment of the invention.

FIG. 14 shows the casing 180 having an insulating member 116 such as an insulating sheet to prevent the short circuit between the electric elements 162 and the metallic casing 180.

Figure 15:
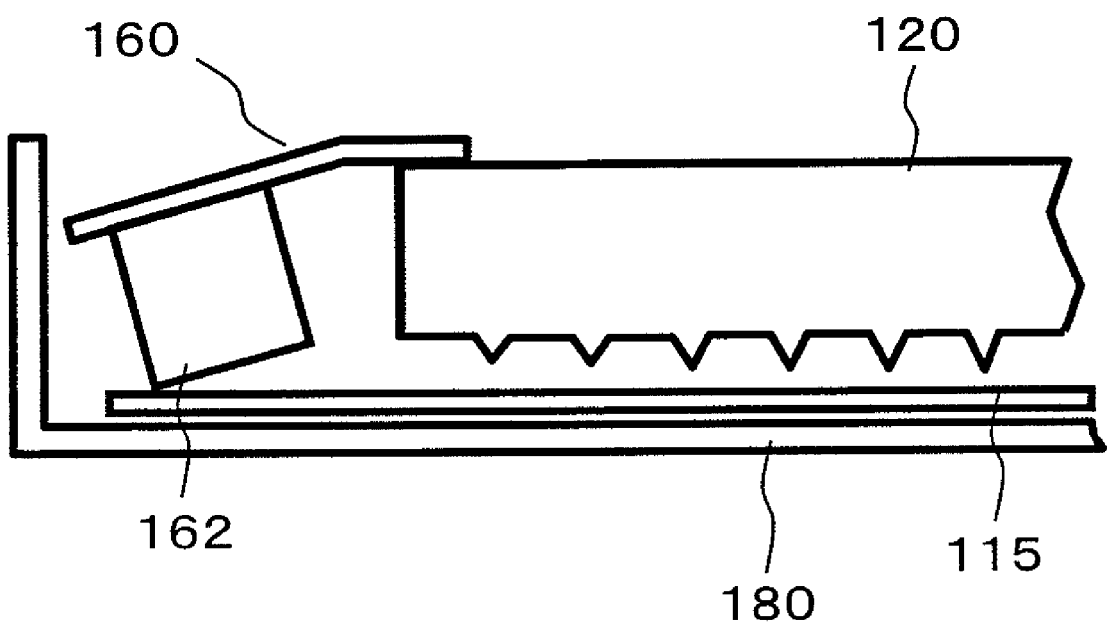
FIG. 15 is a schematic diagram of a backlight of a liquid-crystal display device according to an embodiment of the invention.

FIG. 15 shows the casing 180 in which a reflecting sheet 115 is disposed close to the electric elements 162. When the reflecting sheet 115 is made of an insulating material such as polyester, the reflecting sheet 115 serves as an insulator to prevent the short circuit between the electric elements 162 and the casing 180.

Figure 16:
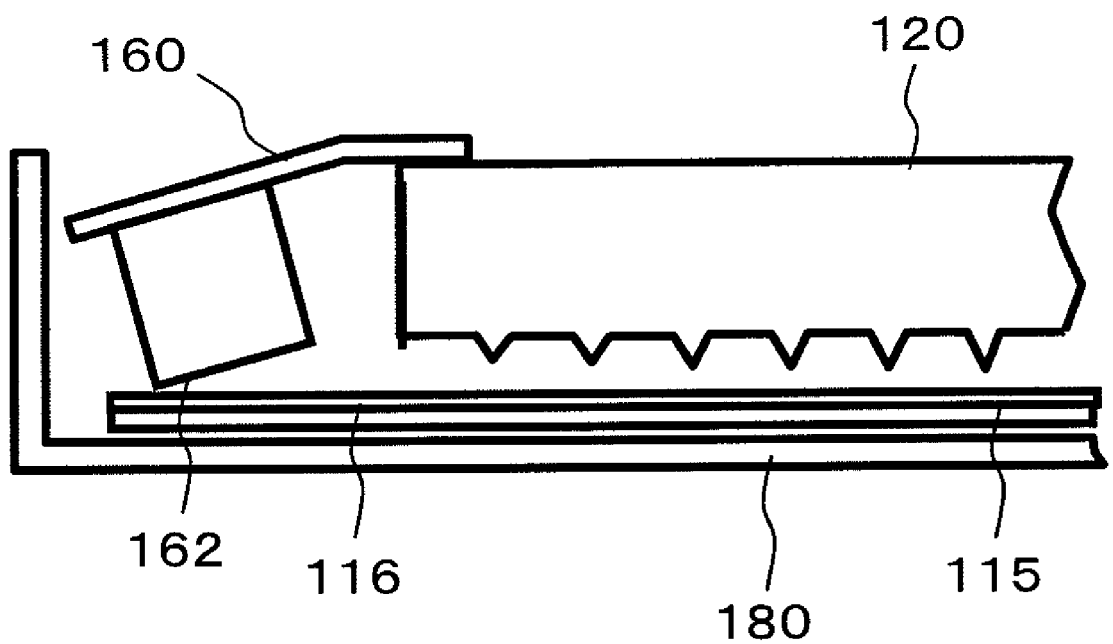
FIG. 16 is a schematic diagram of a backlight of a liquid-crystal display device according to an embodiment of the invention.

FIG. 16 shows a case in which the reflecting sheet 115 has conductivity. The insulating member 116 is provided on the surface of the reflecting sheet 115 to prevent the short circuit between the reflecting sheet 115 and the electric elements 162, and the reflecting sheet 115 prevents the short circuit between the electric elements 162 and the casing 180.

What is claimed is:

1. A liquid-crystal display device comprising:
   a liquid crystal panel; and
   a backlight that applies light onto the liquid crystal panel, wherein
   the backlight includes:
      a light-emitting device;
      a light guide into which the light from the light-emitting device comes;
      electric elements; and
      a circuit board on which the light-emitting device and the electric elements are mounted, wherein the electric elements are mounted closer to the light guide than to the light-emitting device, and wherein the electric elements are disposed between the light-emitting device and the light guide.

2. The liquid-crystal display device according to claim 1, wherein
   the light-emitting device is a light-emitting diode.

3. The liquid-crystal display device according to claim 1, wherein
   the electric elements include a resistor and a capacitor.

4. A liquid-crystal display device comprising:
   a liquid crystal panel; and
   a planar lighting unit that applies light onto the liquid crystal panel, wherein
   the planar lighting unit includes:
      a plurality of light-emitting devices;
      a light guide that applies the light from the light-emitting devices onto the liquid crystal panel;
      electric elements; and
      a circuit board on which the light-emitting devices and the electric elements are mounted; wherein
      the light guide has a top face facing the liquid crystal panel and side faces perpendicular to the top face, a side face of which adjacent to the light-emitting devices has recesses, and the electric elements are disposed in the recesses.

5. The liquid-crystal display device according to claim 4, wherein
   the light-emitting devices are light-emitting diodes.

6. The liquid-crystal display device according to claim 4, wherein
   the electric elements include a resistor and a capacitor.

7. A liquid-crystal display device comprising:
   a liquid crystal panel; and
   a light guide that applies light onto the liquid crystal panel;
   a plurality of light-emitting devices that emits light toward the light guide;
   resistive elements;
   capacitive elements; and
   a circuit board on which the light-emitting devices, the resistive elements, and the capacitive elements are mounted, wherein
   the light guide has a light incident surface adjacent to the light-emitting devices;
   the light-emitting devices are arranged on the circuit board and along a light incident surface of the light guide, the light incident surface having a recess between two adjacent light-emitting devices, the recess being notched in the direction apart from the light-emitting devices; and
   the resistive element and the capacitive element are disposed in the recesses.

8. The liquid-crystal display device according to claim 7, wherein
   the light-emitting devices are light-emitting diodes.

* * * * *